US008911720B2

(12) United States Patent
Ameer et al.

(10) Patent No.: US 8,911,720 B2
(45) Date of Patent: *Dec. 16, 2014

(54) POLY(DIOL CITRATE) ELASTOMERS

(75) Inventors: Guillermo Ameer, Chicago, IL (US); Jian Yang, Evanston, IL (US); Antonio Roy Webb, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,529

(22) Filed: Aug. 28, 2012

(65) Prior Publication Data

US 2012/0322155 A1    Dec. 20, 2012

Related U.S. Application Data

(60) Continuation of application No. 12/370,312, filed on Feb. 12, 2009, now abandoned, which is a division of application No. 10/945,354, filed on Sep. 20, 2004, now abandoned.

(60) Provisional application No. 60/503,943, filed on Sep. 19, 2003, provisional application No. 60/556,642, filed on Mar. 26, 2004.

(51) Int. Cl.
| | |
|---|---|
| *A61K 31/765* | (2006.01) |
| *C08G 63/40* | (2006.01) |
| *C08G 63/06* | (2006.01) |
| *C08G 63/16* | (2006.01) |
| *C08G 63/66* | (2006.01) |
| *C08G 63/685* | (2006.01) |

(52) U.S. Cl.
CPC ............ *C08G 63/40* (2013.01); *C08G 63/06* (2013.01); *C08G 63/16* (2013.01); *C08G 63/66* (2013.01); *C08G 63/685* (2013.01)
USPC .............. 424/78.37; 424/78.08; 424/78.17

(58) Field of Classification Search
None
See application file for complete search history.

(56) References Cited

U.S. PATENT DOCUMENTS

| | | | |
|---|---|---|---|
| 4,352,883 A | 10/1982 | Lim | |
| 4,409,331 A | 10/1983 | Lim | |
| 4,771,101 A * | 9/1988 | Pruett et al. ............ | 525/10 |
| 5,314,927 A * | 5/1994 | Kondo et al. ............ | 521/159 |
| 5,993,843 A | 11/1999 | Sakurada et al. | |
| 6,017,566 A * | 1/2000 | Bunczek et al. ............ | 426/3 |
| 6,503,958 B2 | 1/2003 | Hughes et al. | |
| 6,620,203 B2 | 9/2003 | Atala | |
| 7,022,377 B2 | 4/2006 | Kanada et al. | |
| 7,186,789 B2 | 3/2007 | Hossainy et al. | |
| 2005/0063939 A1 | 3/2005 | Ameer et al. | |

OTHER PUBLICATIONS

Akpalu and Lin, "Multivariable structural characterization of semicrystalline polymer blends by small-angle light scattering," J Polymer Sci., 2002, 40(23):2714-2727.

Bartlett and Jiang, "Measurement of particle size distribution in multilayered skin phantoms using polarized light spectroscopy," Phys Rev E Stat Nonlin Soft Matter Phys., 2002, 65(3 Pt 1):031906.
Bordenave et al., "Clinical performance of vascular grafts lined with endothelial cells," Endothelium, 1999, 6 (4):267-275.
Bos et al., "Small-diameter vascular graft prostheses: current status," Arch Physiol Biochem, 1998, 106(2):100-115.
Carnagey et al., "Rapid endothelialization of PhotoFix natural biomaterial vascular grafts," J Biomed Mater Res B Appl Biomater, 2003, 65(1):171-179.
Chiba and Komatsu, "Mechanical responses of the periodontal ligament in the transverse section of the rat mandibular incisor at various velocities of loading in vitro," J Biomech, 1993, 26:561-570.
Consigny, "Endothelial cell seeding on prosthetic surfaces," J Long Term Eff Med Implants, 2000, 10:79-95.
Dekker et al., "Adhesion of endothelial cells and adsorption of serum proteins on gas plasma-treated polytetrafluoroethylene," Biomaterials, 1991, 12(2):130-138.
Gent, Engineering with Rubber 2E: How to Design Rubber Components, 2001, Hanser Publishers, Munich, 2nd ed., Chapter 2.3.1.3.
Greenwald and Berry, "Improving vascular grafts: the importance of mechanical and haemodynamic properties," J Pathol, 2000, 190(3):292-299.
Greisser et al., "Growth of human cells on plasma polymers: putative role of amine and amide groups," J Biomater Sci Polym Ed, 1994, 5(6):531-554.
Griffith, "Polymeric biomaterials," Acta Mater., 2000, 48:263-277.
Guldberg, "Consideration of mechanical factors," Ann NY Acad Sci., 2002, 961:312-314.
Hubbell et al., "Endothelial cell-selective materials for tissue engineering in the vascular graft via a new receptor," Biotechnology (NY), 1991, 9(6):568-572.
Kim et al., "Optimizing seeding and culture methods to engineer smooth muscle tissue on biodegradable polymer matrices," Biotechnol Bioeng, 1998, 57(1):46-54.
Kim et al., "Simultaneous measurement of angular and spectral properties of light scattering for characterization of tissue microarchitecture and its alteration in early precancer," Selected Topics in Quantum Electronics, 2003, 9 (2):243-256.
Kweon et al., "A novel degradable polycaprolactone networks for tissue engineering," Biomaterials, 2003, 24 (5):801-808.
Langer and Vacanti, "Tissue engineering," Science, 1993, 260(5110):920-926.
Lee and Haut, "Strain rate effects on tensile failure properties of the common carotid artery and jugular veins of ferrets," J Biomech., 1992, 25(8):925-927.
Lisowski et al., "Crystallization Behavior of Poly(ethylene oxide) and Its Blends Using Time-Resolved Wide- and Small-Angle X-ray Scattering," Macromolecules, 2000, 33(13):4842-4849.
Matthews et al., "Nano-Featured highly interconnective cacropourous elastic scaffolds for cardiovascular tissue engineering," IEEE Dallas Engineering in Medicine and Biology Workshop, Nov. 2007, pp. 43-46.
Misof et al., "A new molecular model for collagen elasticity based on synchrotron X-ray scattering evidence," Biophys J., 1997, 72(3):1376-1381.

(Continued)

*Primary Examiner* — James Rogers
(74) *Attorney, Agent, or Firm* — Casimir Jones S.C.

(57) ABSTRACT

The present invention is directed to a novel biocompatible polymer that may be used in tissue engineering. More specifically, the specification describes methods and compositions for making and using a citric acid copolymers.

9 Claims, 16 Drawing Sheets

(56) References Cited

OTHER PUBLICATIONS

Nagata et al., "Syntheis and enzymatic degradation of regular network aliphatic polyesters," Reactive & Functional Polymers, 1996, 30:165-171.
Odian, Principles of Polymerization, 3rd ed., Wiley, 1991.
Szuromi et al., "Preparation and Analysis of Cross-Linking Copolymers," Macromolecules, 2000, 33:3993-3998.
Van Wachem et al., "Interaction of cultured human endothelial cells with polymeric surfaces of different wettabilities," Biomaterials, 1985, 6(6):403-408.
Van Zanten et al., "Phosphatidylcholine Vesicle Diameter, Molecular Weight and Wall Thickness Determined by Static Light Scattering," Journal of Colloid and Interface Science, 1994, 165(2):512-518.
Vega et al., "Latex particle size distribution by dynamic light scattering: novel data processing for multiangle measurements,"Journal of Colloid and Interface Science, 2003, 261(1):74-81.
Wang et al., "A tough biodegradable elastomer," Nat Biotechnol, 2002, 20(6):602-606.
Wu et al., "Preliminary report on microencapsulated islet transplantation in experimental diabetes mellitus in China," Int J Pancreatol., 1988, 3(1):91-100.
Xue and Greisler, "Biomaterials in the development and future of vascular grafts," J Vasc Surg., 2003, 37 (2):472-480.
Yang et al., "Novel Citric Acid-Based Biodegradable Elastomers for Tissue Engineering," Adv Mater., 2004, 16:511-516.
Yang et al., "Enhanced cell affinity of poly (D,L-lactide) by combining plasma treatment with collagen anchorage," Biomaterials, 2002, 23(12):2607-2614.
Yang et al., "Fabrication and surface modification of macroporous poly(L-lactic acid) and poly(L-lactic-co-glycolic acid) (70/30) cell scaffolds for human skin fibroblast cell culture," J Biomed Mater Res, 2002, 62(3):438-446.
Ziegler and Nerem, "Tissue engineering a blood vessel: regulation of vascular biology by mechanical stresses," J Cell Biochem, 1994, 56(2):204-209.

* cited by examiner

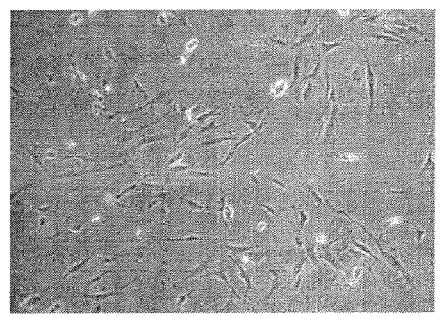 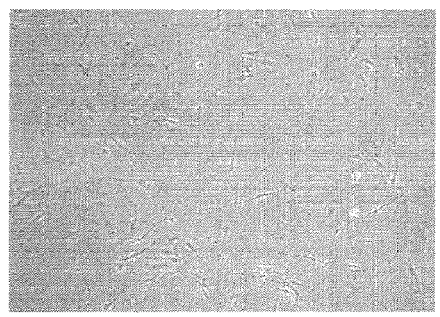
(A)             (B)
FIGURE 12

Figure 14A (tensile stress) and 14B(elongation)
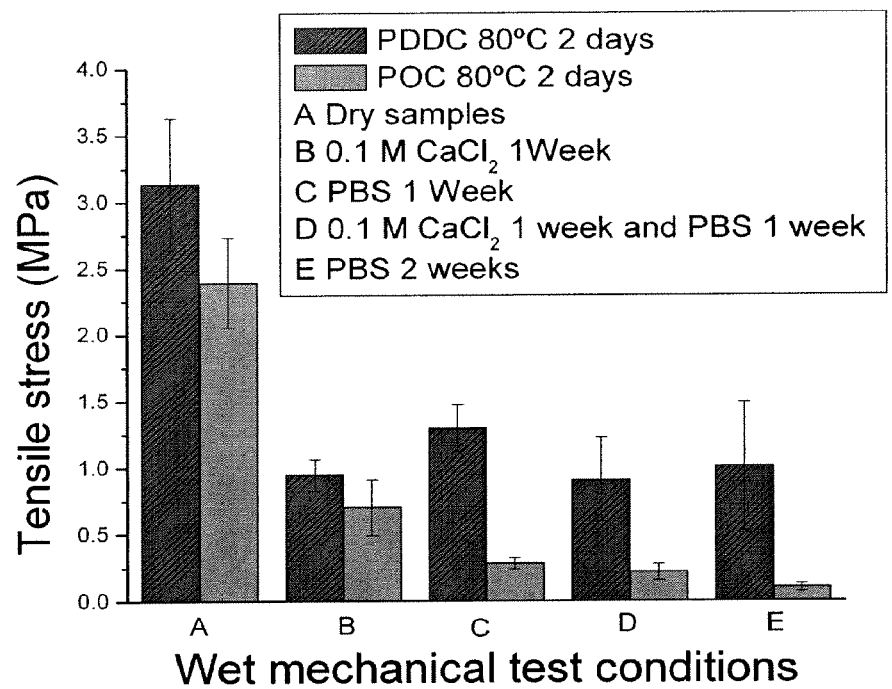
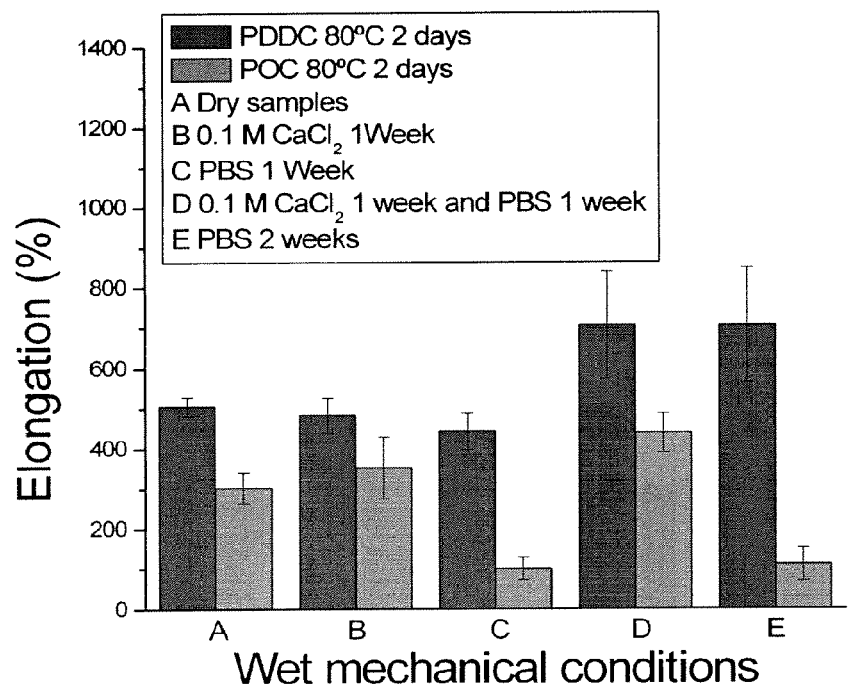

A

B

C

D

POLY(DIOL CITRATE) ELASTOMERS

The present application claims the benefit of priority of U.S. Provisional Patent Application Ser. No. 60/503,943 filed Sep. 19, 2003 and U.S. Patent Application Ser. No. 60/556,642, filed Mar. 26, 2004. Each of the foregoing applications are specifically incorporated herein by reference in its entirety.

Some experimental data described herein was generated with the support of National Institutes of Health training grant R21HL71921-02.

BACKGROUND

1. Field of the Invention

The present invention is generally directed to a substrate used for tissue engineering. The substrate is a biodegradable elastomeric polymer. Methods and compositions for testing and using the same are disclosed.

2. Background of the Related Art

The field of tissue engineering has slowly emerged within the past 2 decades, driven primarily by the large demand for replacement of diseased or damaged tissue [1]. Tissue engineering presents enormous challenges and opportunities for materials science from the perspective of both materials design and materials processing [2]. Successful tissue regeneration must go beyond reproducing shape and structure to restore biological and mechanical function and long-term integration with surround native tissues [3]. Tissue engineering requires the use of a three dimensional scaffold for cells to grow and differentiate properly.

Generally, the ideal cell scaffold in tissue engineering should be biocompatible and biodegradable, promote cellular interaction and tissue development, and possess proper mechanical and physical properties. The cell scaffolds are implanted in a mechanically dynamic environment in the body; the scaffold must sustain and recover from various deformations without mechanical irritations to the surrounding tissues. The properties of scaffolds should resemble those of the extracellular matrix (ECM), a soft, tough, and elastomeric proteinaceous network that provides mechanical stability and structural integrity to tissues and organs [4].

Mechanical stimuli play an important role in the development of tissues. In vascular engineering, for example, the extent to which the initial compliance may affect the long-term function of the graft remains controversial [5]. It has long been realized the fibrous tissue formation within and surrounding and implanted vascular graft would compromise graft compliance. Compliance mismatch between the grafts and host vessel may contribute to the development of incomplete endothelialization and myointimal hyperplasia at the anastomotic regions. Hence, elastomeric materials are attractive in tissue engineering especially in soft tissue engineering such as vascular, ligament, and meniscus engineering [6].

Current elastomers in tissue engineering can be categorized as naturally derived materials and synthetic polymers. Naturally derived materials such as collagen and elastin must be isolated from human, animal or plant tissue. This process typically results in a high cost and large batch to batch variations. These materials also exhibit a limited range of physical properties and immune response is always a concern [7][8]. Typical synthetic elastomeric materials include poly(4-hydroxybutyrate) (P4HB), polyurethane (PU), polycarpolactone (PCL), poly(glycerol-sebacate) (PGS) [4] and so on. PHB has a much higher modulus (stiffer) and much lower sfum to failure compared the normal soft tissues. PU has been investigated extensively as elastomeric materials for vascular grafts. One major concern about PU, however, is the potential carcinogenic effect of its degradation products. A statement issued by FDA suggested that the implanted PU foam might degrade and form 2,4-toluene diamine, which has been shown to cause liver cancer in laboratory animals [6]. PCL is a semi-crystalline linear resorbable aliphatic elastomeric polyester.

The Food and Drug Administration (FDA) has approved a number of medical and drug delivery devices made by PCL. However, applications of PCL might be limited because degradation and resorption of PCL are considerably slow due to its hydrophobic character and high crystallinity. The hydrophobic surface also has impacts to the cell attachment on PCL [9]. PGS is a newly developed elastomer which exhibits good mechanical properties and biocompatibility. High temperature and high vacuum, however, are needed for the polymer synthesis. [10]

SUMMARY OF THE INVENTION

The present invention is directed to a novel biocompatible elastomeric polymer that may be used in tissue engineering. More specifically, the specification describes methods and compositions for making and using citric acid copolymers. In certain embodiments, there is provided a composition comprising a citric acid polyester having a linear aliphatic dihydroxy monomer; and citric acid. In specific embodiments, a linear diol comprises between about 2 and about 20 carbons. While in certain embodiments, all the linear aliphatic dihydroxy monomers of a polymer the same linear diol, other embodiments contemplate different linear diols. A particularly preferred linear diol is 1,8, octanediol. In other embodiments, the linear aliphatic dihydroxy monomer may be 1,10decanediol. The diol also may be an unsaturated diol, e.g., tetradeca-2,12-diene-1,14-diol, or other diols including macromonomer diols such as polyethylene oxide, and Nmethyldiethanoamine (MDEA). This family of elastomers is named as poly(diol citrate). In particularly preferred embodiments, the composition of the invention is dihydroxy poly 1, 8-octanediol co-citric acid. Poly(diol citrate) can also form hybrids with other materials like hydroxyapatite to form elastomeric composites.

Another aspect of the invention contemplates a substrate that may be formulated for tissue culture and/or tissue engineering wherein the substrate is made of a citric acid polymer as described herein. In preferred embodiments, the substrate may further comprise a surface modification that allows cellular attachment. Preferably, the polymer of the invention employed as cell/tissue culture substrate is biodegradable. Preferably, the polymer also is biocompatible. The "biocompatible" is intended to encompass a polymer that may be implanted in vivo or alternatively may be used for the growth of cells that may be implanted in vivo without producing an adverse reaction, such as an immunological response or otherwise altering the morphology of the cells grown thereon to render the cells incompatible with being implanted in vivo or used to model an in vivo organ.

Also contemplated herein is a method of producing engineered tissue, comprising providing a biodegradable citric acid polymer of the present invention as a scaffold for the growth of cells and culturing cells of said tissue on the scaffold. In preferred methods, the polymer is poly 1,8-octanediol-co-citric acid, or a derivative thereof. In specific embodiments, the cells are selected from the group consisting of endothelial cells, ligament tissue, muscle cells, bone cells, cartilage cells. In other preferred embodiments, the tissue engineering method comprises growing the cells on the scaffold in a bioreactor.

Other features and advantages of the invention will become apparent from the following detailed description. It should be understood, however, that the detailed description and the specific examples, while indicating preferred embodiments of the invention, are given by way of illustration only, because various changes and modifications within the spirit and scope of the invention will become apparent to those skilled in the art from this detailed description.

BRIEF DESCRIPTION OF THE FIGURES

FIG. 12 is a photomicrograph (×100) of human aortic smooth muscle cells (A) and human aortic endothelial cells (B) on PDC.

FIGS. 14A and 14B shows graphs depicting the results of wet mechanical tests for POC and PDDC under different conditions. FIG. 14A shows tensile strength and FIG. 14B shows elongation.

DESCRIPTION OF THE PREFERRED EMBODIMENTS

A. New Biodegradable Elastomeric Polymers

Figure 1:
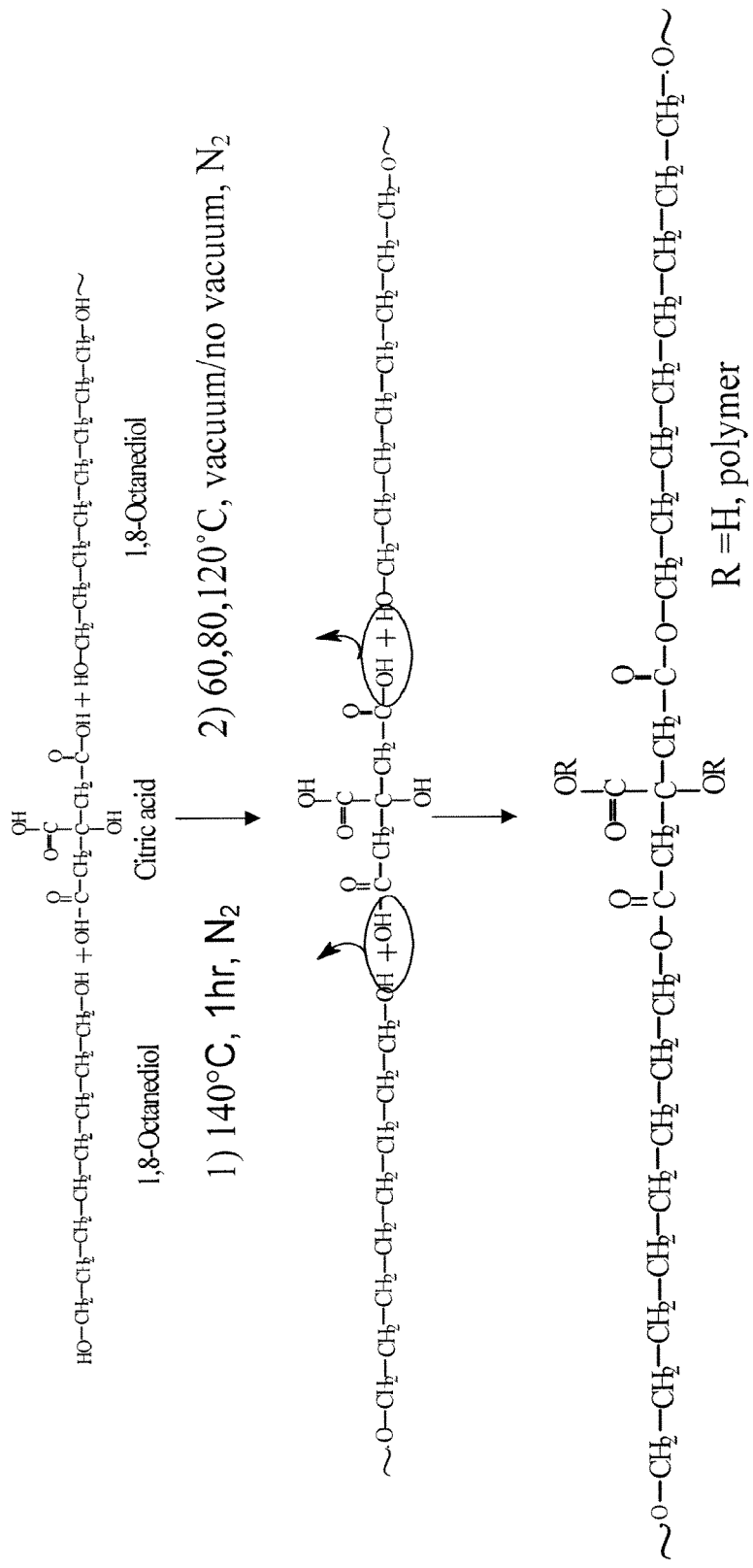
FIG. 1 is a schematic representation of the synthesis of poly(1,8-octanediol-co-citric acid)

Described in the present specification are a family of novel biodegradable elastomeric polymers comprising a polyester network of citric acid copolymerized with a linear aliphatic di-OH monomer in which the number of carbon atoms ranges from 2 to 20. Polymer synthesis conditions vary from mild conditions, even at low temperature (less than 100° C.) and no vacuum, to tough conditions (high temperature and high vacuum) according the requirements for the materials properties. By changing the synthesis conditions (including, but not limited to, post-polymerization temperature, time, vacuum, the initial monomer molar ratio, and the di-OH monomer chain length) the mechanical properties of the polymer can be modulated over a wide range. This series of polymers exhibit a soft, tough, biodegradable, hydrophilic properties and excellent biocompatibility in vitro.

The polymers of the present invention comprise a linear, aliphatic diol and citric acid.

In preferred embodiments, the linear, aliphatic diol is 1,8-octanediol. However, it should be understood that this is merely an exemplary linear, aliphatic diol. Those of skill are aware of other aliphatic alcohols that will be useful in polycondensation reactions to produce poly citric acid polymers. Exemplary such aliphatic diols include any diols of between about 2 carbons and about 20 carbons. While the diols are preferably aliphatic, linear, unsaturated diols, with the hydroxyl moiety being present at the C1 and Cx position (where x is the terminal carbon of the diol), it is contemplated that the diol may be an unsaturated diol in which the aliphatic chain contains one or more double bonds. The preferred identity for the linear, aliphatic diol in one embodiment is 1,8, octanediol, however it may be any other aliphatic alcohols. While in specific embodiments, the linear, aliphatic diols of the polymer are the same diol, e.g., 1, 8-octanediol, it should be understood that linear, aliphatic diols of the polymer may have different carbon lengths. For example, linear, aliphatic diols of the polymer may be 2,3,4,5,6, 7,8,9, 10, 11, 12, 13, 14, 15,16, 17, 18, 19, 20 or more carbons in length. Exemplary methods for the polycondensation of the citric acid with the linear diols are provided herein below in the Examples.

The polymers of present invention may be utilized to form hybrids with other materials to form elastomeric composites. In those embodiments where the other materials are used, the other materials can be in-organic materials, polymers with any kind of forms such as powder, fiber, and films. The other materials can also be elastomeric or non-elastomeric. In a particularly embodiment, the elastomeric composite can be a hybrid of the polymers of present invention with hydroxyapatite (POC-HA).

The polymers of the present invention may be useful both as substrata for the growth and propagation of tissues cells that may be seeded on the substrata and also as implantable devices. In those embodiments where the polymers are used as bioimplantable devices, the substrate may be formulated into a shape suitable for implantation. For example, as described in U.S. Pat. No. 6,620,203 (incorporated herein by reference), it may be desirable to produce prosthetic organ tissue for implantation into an animal, such as e.g., testicular tissue described in the U.S. Pat. No. 6,620,203. Other organs for which tissue implantation patches may be generated include, but are not limited to skin tissue for skin grafts, myocardial tissue, bone tissue for bone regeneration, testicular tissue, endothelial cells, blood vessels, and any other cells from which a tissue patch may be generated. Thus, those of skill in the art would understand that the aforementioned organs/cells are merely exemplary organs/cell types and it should be understood that cells from any organ may be seeded onto the biocompatible polymers of the invention to produce useful tissue for implantation and/or study.

The cells that may be seeded onto the polymers of the present invention may be derived from commercially available cell lines, or alternatively may be primary cells, which can be isolated from a given tissue by disaggregating an appropriate organ or tissue which is to serve as the source of the cells being grown. This may be readily accomplished using techniques known to those skilled in the art. Such techniques include disaggregation through the use of mechanically forces either alone or in combination with digestive enzymes and/or chelating agents that weaken cell-cell connections between neighboring cells to make it possible to disperse the tissue into a suspension of individual cells without appreciable cell breakage. Enzymatic dissociation can be accomplished by mincing the tissue and treating the minced tissue with any of a number of digestive enzymes either alone or in combination. Digestive enzymes include but are not limited to trypsin, chymotrypsin, collagenase, elastase, and/or hyaluronidase, Dnase, pronase, etc. Mechanical disruption can also be accomplished by a number of methods including, but not limited to the use of grinders, blenders, sieves, homogenizers, pressure cells, or sonicators to name but a few. For a review of tissue disaggregation techniques, see Freshney, Culture of Animal Cells. A Manual of Basic Technique, 2d Ed., A. R. Liss, Inc., New York, 1987, Ch. 9, pp. 107-126.

Once the primary cells are disaggregated, the cells are separated into individual cell types using techniques known to those of skill in the art. For a review of clonal selection and cell separation techniques, see Freshney, Culture of Animal Cells. A Manual of Basic Techniques, 2d Ed., A. R. Liss, Inc., New York, 1987, Ch. 11 and 12, pp. 137-168. Media and buffer conditions for growth of the cells will depend on the type of cell and such conditions are known to those of skill in the art.

In certain embodiments, it is contemplated that the cells attached to the biocompatible polymeric substrates of the invention are grown in bioreactors. A bioreactor may be of any class, size or have any one or number of desired features, depending on the product to be achieved. Different types of bioreactors include tank bioreactors, immobilized cell bioreactors, hollow fiber and membrane bioreactors as well as digesters. There are three classes of immobilized bioreactors, which allow cells to be grown: membrane bioreactors, filter or mesh bioreactors, and carrier particle systems. Membrane bioreactors grow the cells on or behind a permeable membrane, allowing the nutrients to leave the cell, while preventing the cells from escaping. Filter or mesh bioreactors grow the cells on an open mesh of an inert material, allowing the culture medium to flow past, while preventing the cells from escaping. Carrier particle systems grow the cells on something very small, such as small nylon or gelatin beads. The bioreactor can be a fluidized bed or a solid bed. Other types of bioreactors include pond reactors and tower fermentors. Any of these bioreactors may be used in the present application for regenerating/engineering tissues on the citric acid polymers of the present invention.

Certain tissues that are regenerated by use of the citric acid polymers of the invention may be encapsulated so as to allow the release of release of desired biological materials produced by the cells at the site of implantation, while sequestering the implanted cells from the surrounding site. Cell encapsulation can be applied to all cell types secreting a bioactive substance either naturally or through genetic engineering means. In practice, the main work has been performed with insulin secreting tissue.

Encapsulation procedures are most commonly distinguished by their geometrical appearance, i.e. micro- or macro-capsules. Typically, in microencapsulation, the cells are sequestered in a small permselective spherical container, whereas in macroencapsulation the cells are entrapped in a larger non-spherical membrane, Lim et al. (U.S. Pat. Nos. 4,409,331 and 4,352,883) discloses the use of microencapsulation methods to produce biological materials generated by cells in vitro, wherein the capsules have varying permeabilities depending upon the biological materials of interest being produced, Wu et al, Int. J. Pancreatology, 3:91-100 (1988), disclose the transplantation of insulin-producing, microencapsulated pancreatic islets into diabetic rats.

As indicated above, the cells that are seeded on the polymers of the present invention may be cell lines or primary cells. In certain preferred embodiments, the cells are genetically engineered cells that have been modified to express a biologically active or therapeutically effective protein product. Techniques for modifying cells to produce the recombinant expression of such protein products are well known to those of skill in the art.

EXAMPLE 1

Preparation of Poly(1,8-Octanediol-co-citric acid) (POC)

In a typical experiment, 19.212 g citric acid and 14.623 g Octanediol were added to a 250 mL three-neck round-bottom flask, fitted with an inlet adapter and an outlet adapter. The mixture was melted within 15 min by stirring at 160-165° C. in silicon oil bath, and then the temperature of the system was lowered to 140° C. The mixture was stirred for another 1 hr at 140° C. to get the pre-polymer. Nitrogen was vented throughout the above procedures. The pre-polymer was post-polymerized at 60° C., 80° C. or 120° C. with and without vacuum for predetermined time (from one day to 3 weeks depending on the temperature, with the lower temperatures requiring longer times) to achieve the Poly(1,8-octanediol-co-citric acid). Nitrogen was introduced into the reaction system before the polymer was taken out from reaction system.

Porous scaffolds of POC (tubular and flat sheets) were prepared via a salt leaching technique. Briefly, sodium chloride salt was ground up and sieved for particle sizes between 90 and 125 microns. The salt particles are then mixed with the pre-polymer solution to the desired mass fraction to obtain a corresponding porosity. Typically, the mass fraction of the salt particles will result in a similar % porosity.

EXAMPLE 2

Preparation of Porous Scaffolds of POC

Porous scaffolds of POC (tubular and flat sheets) were prepared via a salt leaching technique as follows: POC pre-polymer was dissolved into dioxane to form 25 wt % solution, and then the sieved salt (90-120 microns) was added into pre-polymer solution to serve as a porogen. The resulting slurry was cast into a poly(tetrafluoroethylene) (PTFE) mold (square and tubular shape). After solvent evaporation for 72 h, the mold was transferred into a vacuum oven for post-polymerization. The salt in the resulting composite was leached out by successive incubations in water (produced by Milli-Q water purification system every 12 h for a total 96 h. The resulting porous scaffold was air-dried for 24 hr and then vacuum dried for another 24 hrs. The resulting scaffold was stored in a dessicator under vacuum before use. Porous scaffolds are typically preferred when cells are expected to migrate through a 3-dimensional space in order to create a tissue slice. Solid films would be used when a homogenous surface or substrate for cell growth is required such as an endothelial cell monolayer within the lumen of a vascular graft.

EXAMPLE 3

Characterization of POC

The following Example provides details of methods and results of characterization of POC.

Methods

Fourier Transform Infrared (FTIR) Spectroscopy Measurements. Infrared spectra were recorded on a Biorad FTS40 Fourier transform infrared spectrometer. Sample POC films with thickness of 12-16 microns were prepared from POC solid samples using a Microtome.

Mechanical Tests. Tensile tests were conducted according to ASTM D412a on an Instron 5544 mechanical tester equipped with 500 N load cell. The POC sample size was 26×4×1.5 mm.

Differential Scanning Calorimetry (DSC) Measurements. Differential scanning calorimetry thermograms were recorded in the range of −80 to 600° C. on a DSC550 (Instrument Specialists Inc.) instrument at a heating rate of 10° C./min.

In Vitro Degradation. The disk specimen (7 mm in diameter, about 1 to 1.5 mm thickness) was placed in a small container containing 10 ml phosphate buffer saline (pH 7.4). The container was incubated at 37° C. for various times. After incubation the disk was washed with water and dried under vacuum for one week. The mass loss was calculated by comparing the initial mass (W 0) with that a given time point (WJ), as shown in Eq. (1). Three individual experiments were performed in triplicate for the degradation test. The results are presented as means:1::standard deviation (n=3).

$$\text{Mass loss (\%)} = [(W_0 - W)/W_0] \times 100 \qquad (1)$$

Alkali Hydrolysis. Alkali hydrolysis of the disk specimen (8.5 mm in diameter, about 1 to 1.5 mm thickness) was conducted in a 0.1 M sodium hydroxide aqueous solution at 37° C. for various times. The degree of degradation was estimated from the weight loss expressed as g/m2, which was calculated by dividing the weight loss by the total surface area of the disk.

Cell Culture. Human aortic smooth muscle and endothelial cells (Clonetics) were cultured in a 50 ml culture flask with SmGM-2 and EBM-2 culture medium (Clonetics). Cell culture was maintained in a water-jacket incubator equilibrated with 5% CO2 at 37° C. When the cells had grown to confluence, the cells were passaged using a Subculture Reagent Kit (Clonetics). Polymer films were cut into small pieces (1×2 cm1 and placed in cell culture dishes (6 cm in diameter). Polymer films were sterilized in 70% ethanol and the ethanol was exchanged with an excess amount of phosphate-buffered saline (PBS). The PBS was removed with a pipette and then the samples were sterilized UV light for another 30 min. A 5 ml cell suspension with 6.6×10$^4$/ml was added to the culture dish. The morphology of cell attachment was observed and photographed with an inverted light microscope (Nikon Eclipse, TE2000-U) equipped with a Photometrics Cool-SNAP HQ after culturing a predetermined time. After reaching confluence, the samples were fixed by 2.5% glutaraldehyde solution and dehydrated sequentially in 50, 70, 95 and 100% ethanol each for 10 min. The fixed samples were lyophilized, sputter-coated with gold and examined under scanning electron microscope (SEM, Hitachi 3500N). Polymer films were cut into small disks (7 mm in diameter) with the aid of a cork borer in order to locate the disks into a 96-well tissue culture plate. PLLA films and Tissue culture polystyrene (TCPS) were used as control. The samples were sterilized as described above. The human aortic smooth muscle cells (3.13×10$^3$/well) were added to the wells. The viability and proliferation of the cells were determined by MTT assays. The absorbance of produced Formosan was measured at 570 nm using microplate reader (Tecan, SAFFIRE).

Results

Polycondensation of citric acid and 1,8-octanediol yields a transparent film. The resulting polymer features a small number of crosslinks and carboxyl and hydroxyl groups directly attached to the polymer backbone (FIG. 1).

Figure 2:
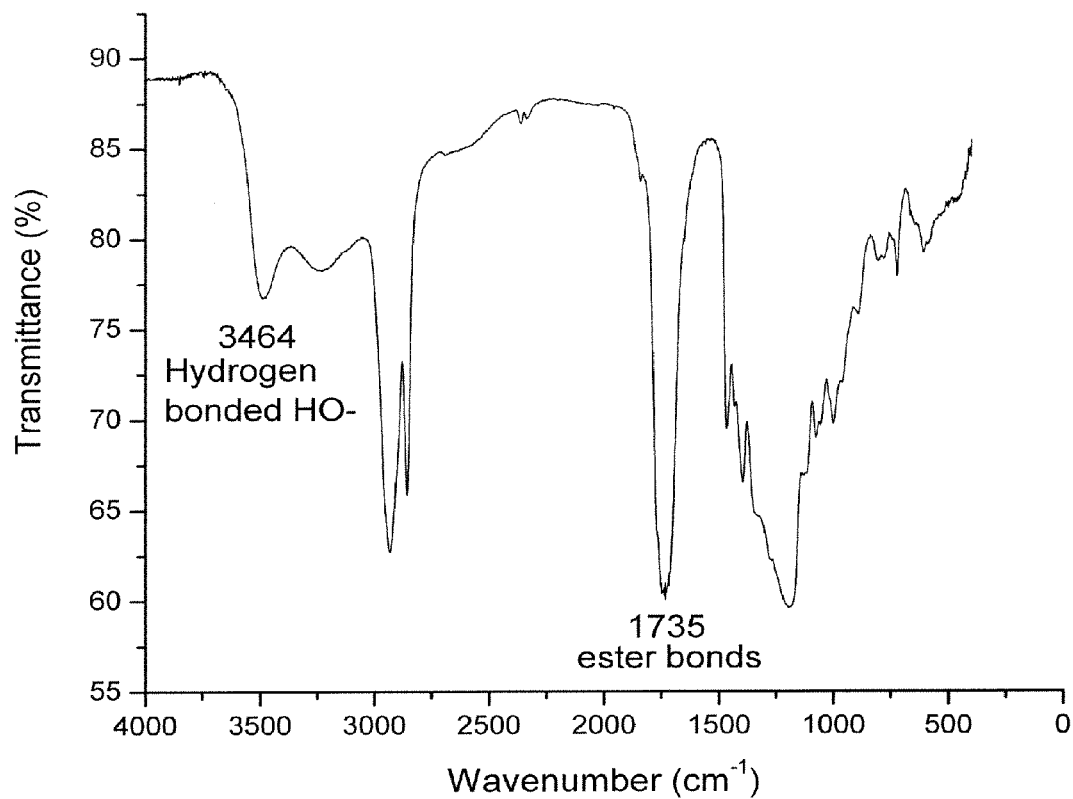
FIG. 2 is an FTIR spectrum of POC

The typical FTIR spectrum of a POC preparation is shown in FIG. 2. The intense C=O stretch at 1,735 cm$^{-1}$ in FTIR spectrum confirms the formation of ester bonds. The intense OH stretch at 3,464 cm$^{-1}$ indicates that the hydroxyl groups are hydrogen bonded.

Figure 3:
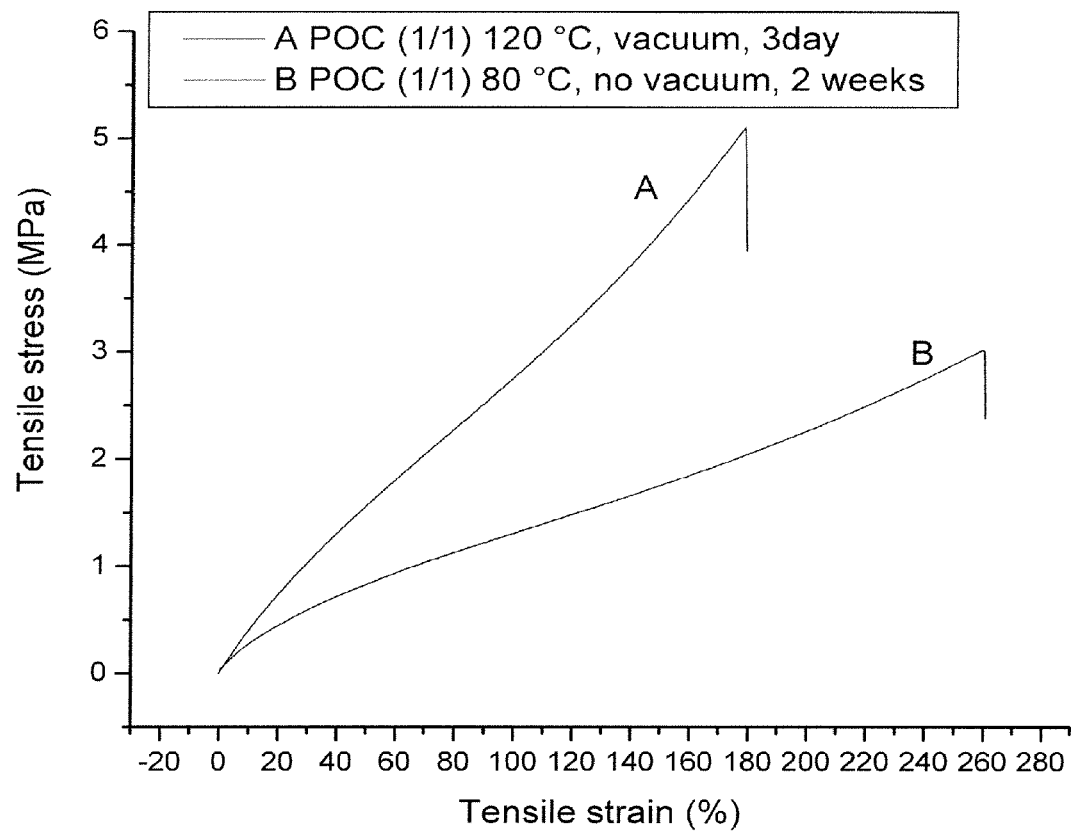
FIG. 3 is a graph depicting stress-strain curves of POC under different reaction conditions

Tensile tests on strips of POC prepared under different synthetic conditions reveal a stress-strain curve characteristic of an elastomeric and tough material (FIG. 3). The nonlinear shape of the tensile stress-strain curve, low modulus and large elongation ratio is typical for elastomers and resembles those of ligament and vulcanized rubber [4]. These results further demonstrate that when the post-polymerization reaction is carried out under lower temperature, the resulting polymer is more elastic than when it is performed at higher temperatures. Post polymerization at lower temperature under vacuum (i.e. 40° C.)) may enable incorporation of biological molecules within POC without significant loss of biological activity. Tissue engineering applications that require significant elasticity and strength such as for vascular grafts and heart valves may benefit from post-polymerization at the lower conditions. Tissue engineering applications that require a more rigid or stiff scaffold such as cartilage tissue engineering would benefit from post-polymerization at the higher temperatures.

Figure 5:
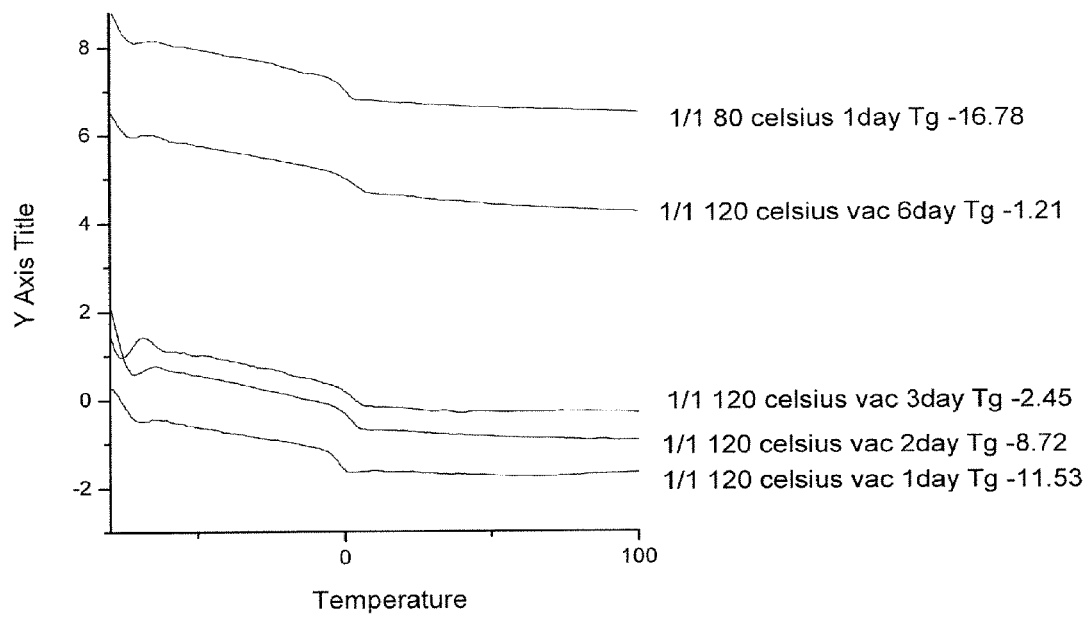
FIG. 5 is a graph depicting DSC thermograms of POC

The thermal properties of POC were investigated by DSC. From the thermograms depicted in FIG. 5, no crystallization temperature and melting temperature are observed and apparent glass transition temperature (Tg) is observed below 0° C. for POC synthesized under a variety of conditions. This result shows POC is totally amorphous at 37° C. similar to the vulcanized rubber. FIG. 5 shows the Tg changes with the synthesis conditions. Increasing post-polymerization temperature and elongating the treating time can increase the crosslinking density and then result in the increase of Tg. The Tg is still significantly below 37° C., making the material elastomeric for tissue engineering applications that require elastomeric scaffolds (i.e. cardiovascular, pulmonary, ligament tissue engineering). This result also confirms that POC is a cross-linked polymer. Similar results were observed with PDC.

Figure 6:
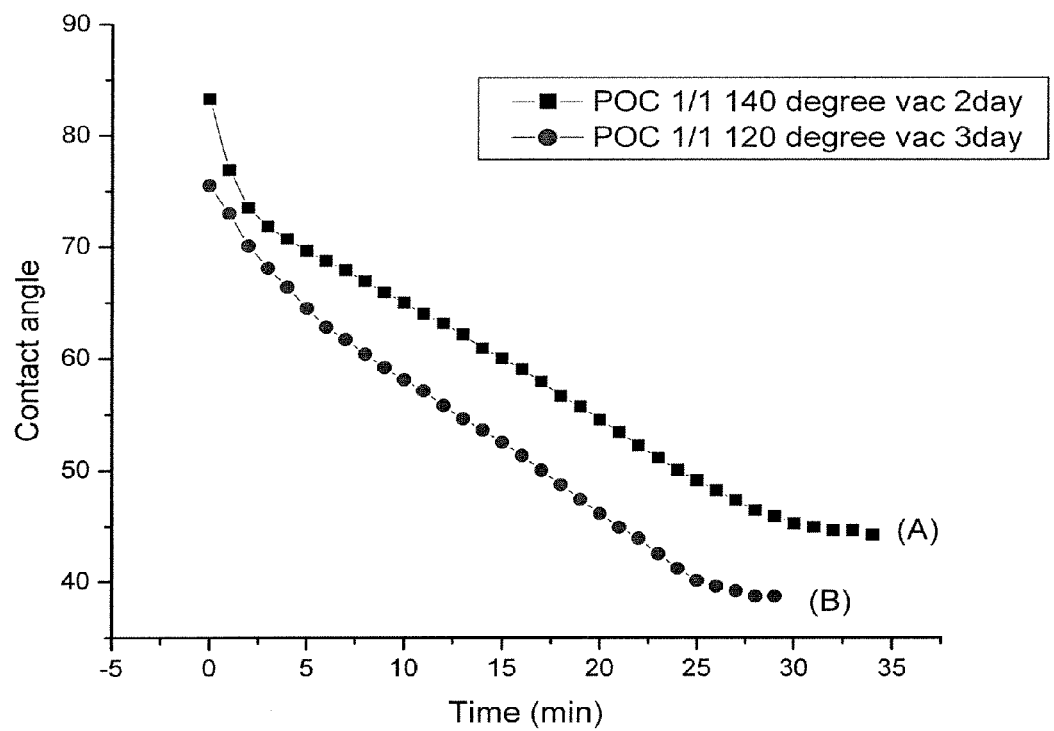
FIG. 6 is a graph depicting the contact angle to water vs. time curve of POC.

FIG. 6 shows the contact angle to water vs. time curve of POC. The initial contact angle of the POC synthesized under different conditions is 76° and 84°, respectively. The water drop spread out with the time. The contact angles finally reach 38° and 44°, respectively. Although the initial contact angle is relatively high, the polymer chains are highly mobile since POC is a rubber-like and amorphous polymer at room temperature, and the polar water molecules can induce the polar groups such as hydroxyl and carboxyl to enrich at the polymer surface via surface rearrangement. The results show POC is a hydrophilic polymer. Hydrophilic polymers are expected to promote endothelial cell adhesion and proliferation as presented in preliminary data.

Figure 7:
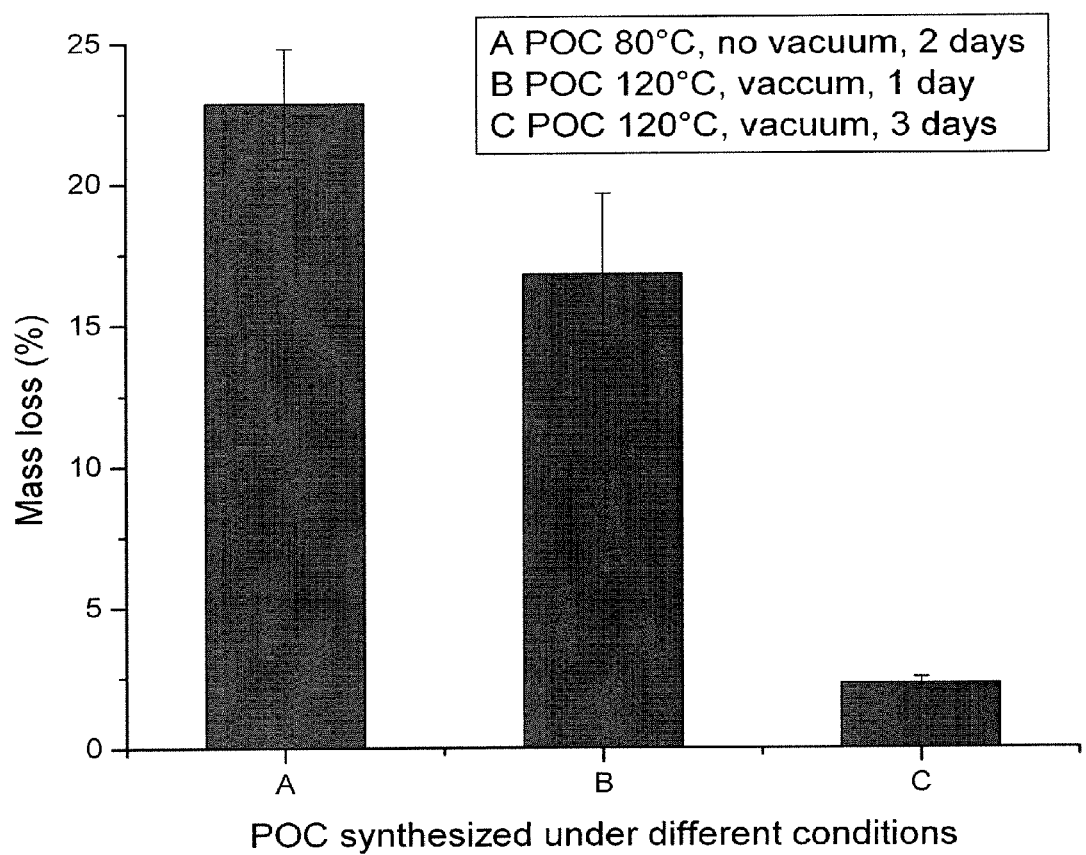
FIG. 7 is a graph depicting the degradation of POC synthesized under different conditions after incubated in PBS at 37° C. for 6 weeks.
Figure 8:
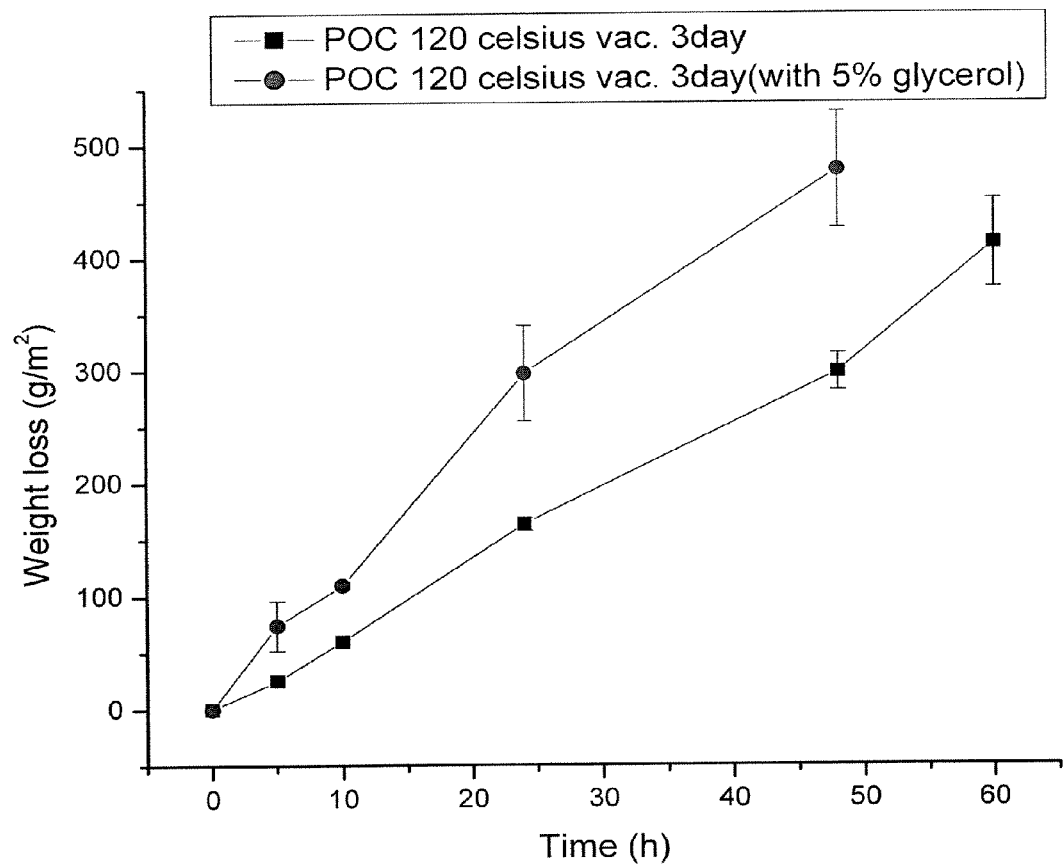
FIG. 8 is a graph depicting weight loss in alkali solution (0.1 M sodium hydroxide aqueous) of POC with or without 5% (monomer mole ratio) glycerol.

FIG. 7 shows the degradation of POC synthesized under different conditions after incubation in PBS at 37° C. for 6 weeks. POC synthesized under mild conditions (A) has a faster degradation rate compared to that of POC synthesized under relatively tougher conditions (B and C). The degradation rate of POC (B) is considerably faster than that of POC (C). POC synthesized under tough conditions features a high cross-linking degree and the penetration of water molecules into the network films is difficult because of the smaller network space. This is the reason why the degradation rate sequence is POC (A)>POC (B)>POC (C). These results show that POC is degradable polymer. The degradation rate can be modulated by changing synthesis conditions.

In order to achieve better control for the degradation of "highly cross-linked" POC, a third monomer, glycerol is added in addition to the citric acid and diol monomer (0-3 mol %, the molar ratio of carboxyl and hydroxyl group among the three monomers was maintained as 1/1). Increasing amounts of glycerol will result in an increased break strength and Young's modulus. The alkali hydrolysis results show that the addition of glycerol can enhance the degradation of POC in alkali solution. Glycerol is a hydrophilic component. Its addition can facilitate the water penetration into the network films which results in the faster degradation rate.

Figure 9:
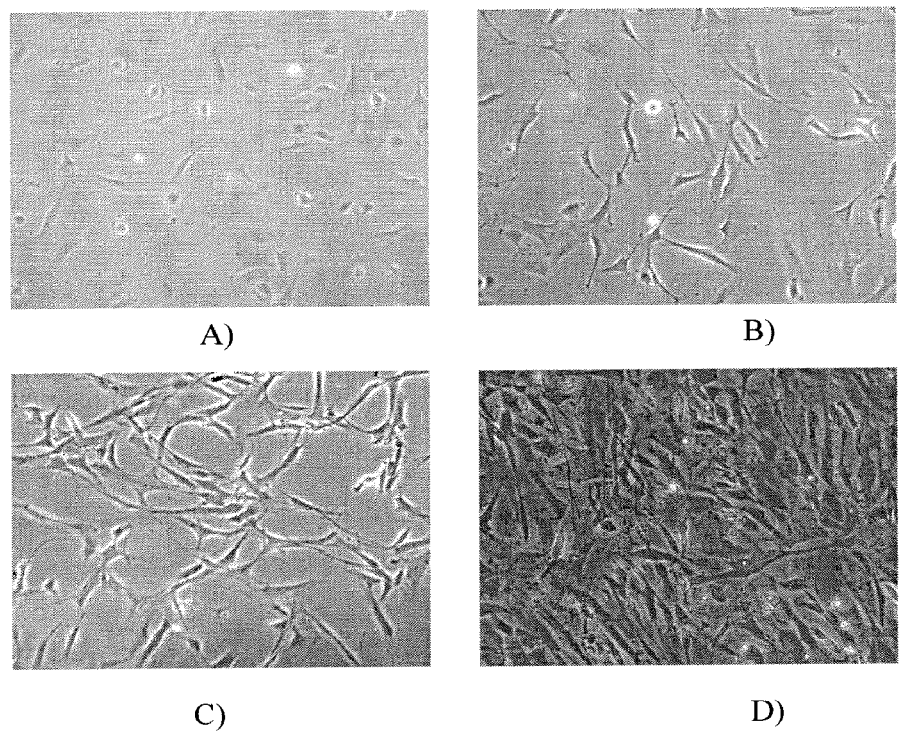
FIG. 9 is a photomicrograph (×100) of human aortic smooth muscle cells on POC at different culture times: A) 1 hour B) 5 hours C) 24 hours and D) 8 days.
Figure 11:
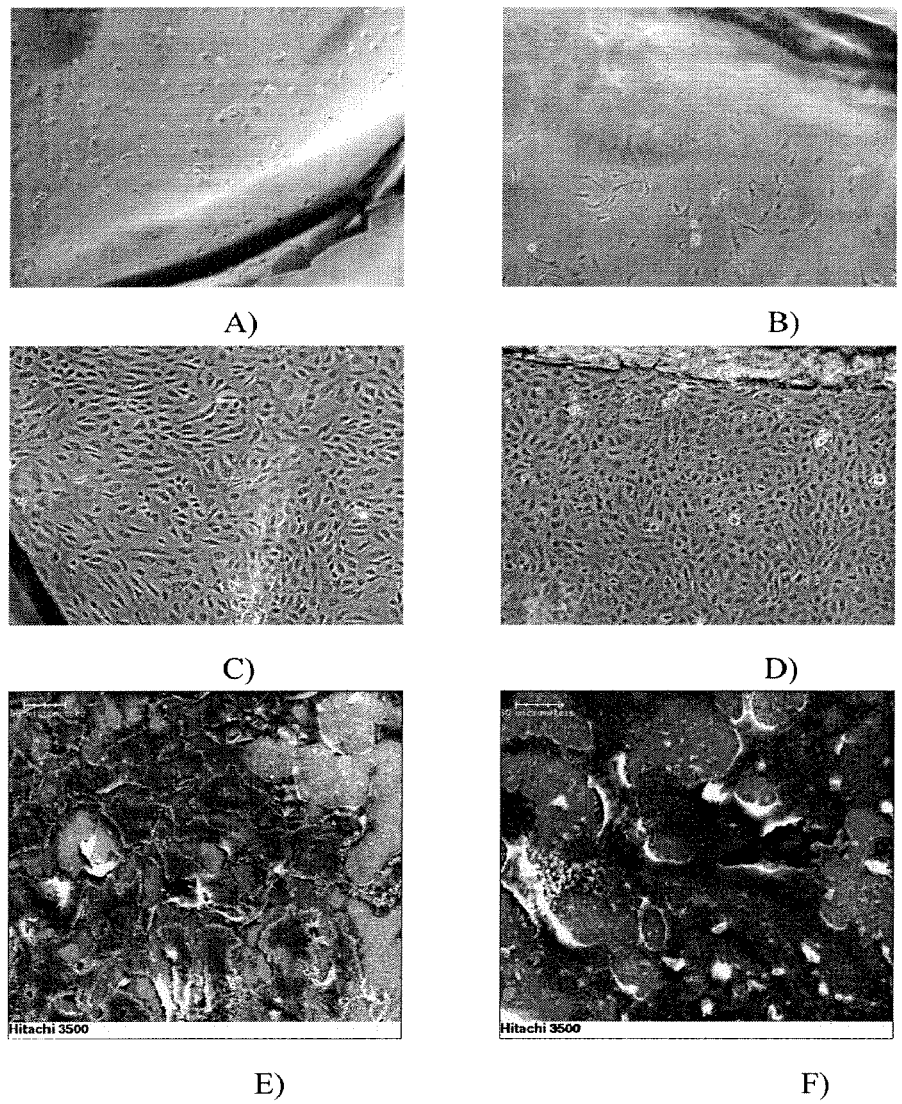
FIG. 11 is a photomicrograph (×100) (A, B, C, and D) and SEM pictures (E and F) of human aortic endothelial cells on POC at different culture times: A) 1 hour; B) 24 hours: C) 4 days; D) 6 days; E) and F) 6 days.
Figure 13:
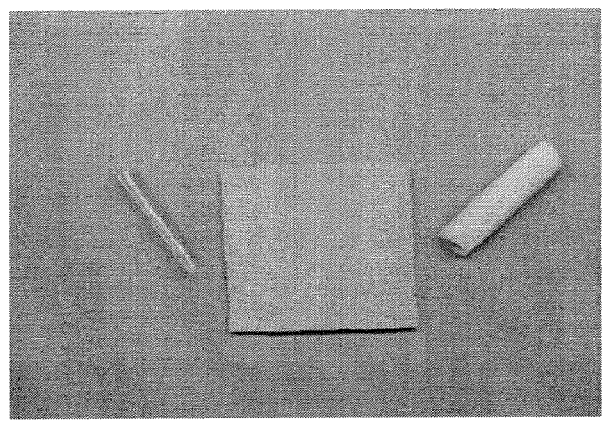
FIG. 13 is a photograph depicting porous and non-porous tube scaffold and sponge scaffold made by POC.

The in vitro biocompatibility of POC was evaluated in order to investigate the potential application in tissue engineering, especially for soft tissue engineering such as vascular graft, ligament, bladder, and cartilage. Human smooth muscle cells and endothelial cells are chosen as model cells. FIGS. 9 and 11 show the morphology of both cell types on POC films at different culture times. The results indicate that POC is a good substrate for supporting the both cells attachment. Both cells grow promptly and achieve confluence on POC.

Figure 10:
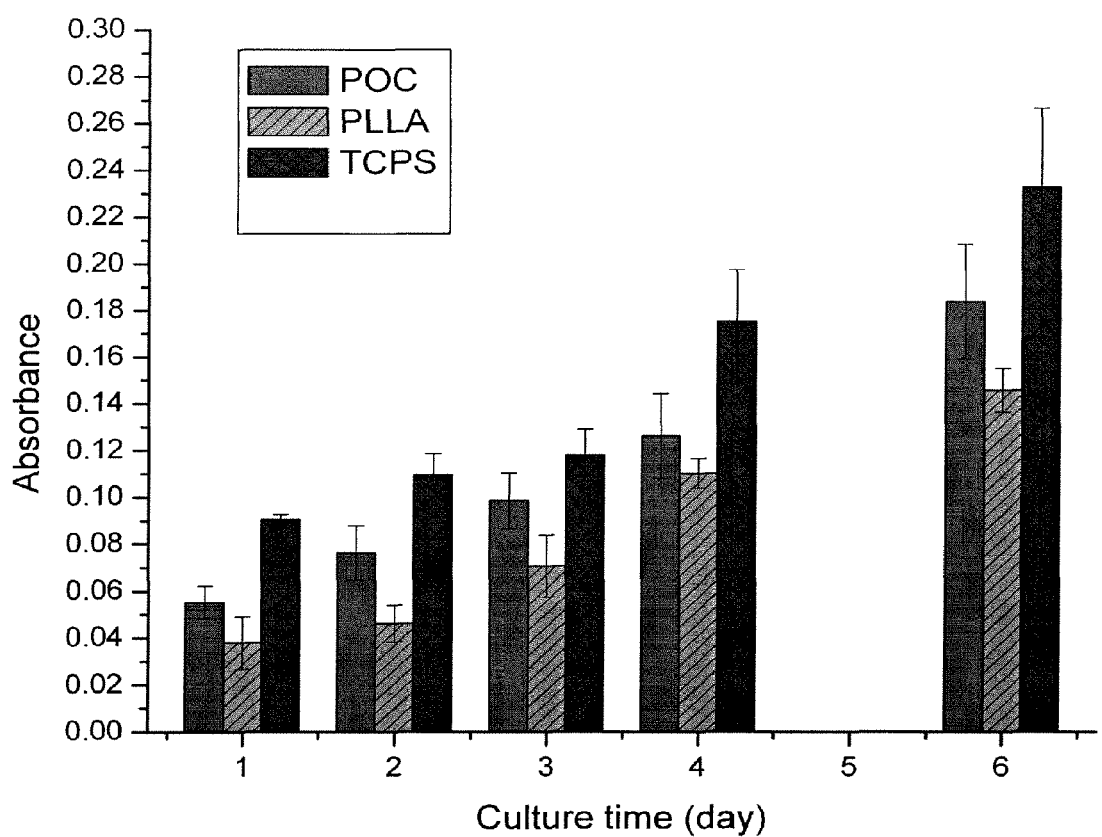
FIG. 10 is a graph depicting the results of an MTT-tetrazonium assay of human aortic smooth muscle cells on POC, PLLA (Mw=300,000), and tissue culture polystyrene (TCPS). Formosan absorbance is expressed as a function of culture time.

Cell attachment and growth are also observed on PDC (FIG. 12). MTT assays (an indicator of cell viability) also indicate that POC is a better substrate for cell growth than PLLA (FIG. 10). Synthetic materials have attracted many interests as small diameter grafts. Normally, the synthetic grafts have not produced acceptable results because of rapid thrombotic buildup in the vessel lumen [13]. Researchers have been attempting to improve graft performance by adding an endothelial lining and thus better mimicking the vessels in the body [14,15]. Failure of grafts was associated with sub-intimal hyperplasia and a thrombotic surface, possibly resulting in part from lack of a confluent layer of endothelial cells on the graft lumen. Many methods have been developed for improving the endothelial cell attachment and growth such as immobilizing cell adhesion peptides (GREDVY) on polymer surfaces [16], plasma modification using radio frequency glow discharge [17] and so on. Endothelial cells adherence can be dramatically increased when the grafts are coated with extracellular matrix, plasma or fibronectin. Unfortunately for graft compatibility, coating with fibronectin increases not only the adhesion of endothelial cells to those surfaces, but of platelets as well [18]. Optimal adherence has been reported for gas plasma-treated surfaces with hydrophilicity in the range of 40-60° by Dekker [19] and van Wachem [20]. This effect was attributed to specific protein adsorption favorable for adhesion, spreading, and proliferation of endothelial cells, and improved deposition of endothelial matrix proteins. For POC, the hydrophilicity is in the above range, which may help the adsorption of glycoproteins on the polymer surface. The surface-enriched polar groups such as carboxyl and hydroxyl may facilitate the cell attachment and growth [21,22]. No additional pre-treatments are needed and the endothelial cells confluence on POC films can be achieved in a short time.

EXAMPLE 4

Synthesis of Poly(1,6-hexanediol-co-citric acid) (PHC)

In a typical experiment, 19.212 g citric acid and 11.817 g 1,6-hexanediol were added to a 250 ml three-neck round-bottom flask, fitted with an inlet adapter and an outlet adapter. The mixture was melted within 15 min by stirring at 160-165° C. in a silicon oil bath, and then the temperature of the system was lowered to 120° C. The mixture was stirred for half an hour at 120° C. to get the pre-polymer. Nitrogen was vented throughout the above procedures. The pre-polymer was post-polymerized at 60° C., 80° C. or 120° C. with and without vacuum for a predetermined time from one day to 3 weeks, depending on the temperature, to achieve the Poly(1,6-hexanediol-co-citric acid). Nitrogen was introduced into the reaction system before the polymer was taken out from reaction system.

EXAMPLE 5

Synthesis of Poly(1,10-decanediol-co-citric acid) (PDC)

In a typical experiment, 19.212 g citric acid and 17.428 g 1,10-decanediol were added to a 250 ml three-neck round-bottom flask, fitted with an inlet adapter and an outlet adapter. The mixture was melted within 15 min by stirring at 160-165° C. in silicon oil bath, and then the temperature of the system was lowered to 120° C. The mixture was stirred for half an hour at 120° C. to get the pre-polymer. Nitrogen was vented throughout the above procedures. The pre-polymer was post-polymerized at 60° C., 80° C. or 120° C. with and without vacuum for predetermined time from one day to 3 weeks depending on the temperature to achieve the Poly(1,10-decanediol-co-citric acid). Nitrogen was introduced into the reaction system before the polymer was taken out from reaction system.

EXAMPLE 6

Synthesis of Poly(1,12-dodecanediol-co-citric acid) PDDC

In a typical experiment, 19.212 g citric acid and 20.234 g 1,12-dodecanediol were added to a 250 ml three-neck round-bottom flask, fitted with an inlet adapter and an outlet adapter. The mixture was melted within 15 min by stirring at 160-165° C. in silicon oil bath, and then the temperature of the system was lowered to 120° C. The mixture was stirred for half an hour at 120° C. to get the pre-polymer. Nitrogen was vented throughout the above procedures. The pre-polymer was post-polymerized at 60° C., 80° C. or 120° C. with and without vacuum for predetermined time from one day to 3 weeks depending on the temperature to achieve the Poly(1,12-dodecanediol-co-citric acid). Nitrogen was introduced into the reaction system before the polymer was taken out from reaction system.

EXAMPLE 7

Synthesis of Poly(1,8-octanediol-co-citric acid-co-glycerol)

In a typical experiment (Poly(1,8-octanediol-co-citric acid-co-1% glycerol), 23.0544 g citric acid, 16.5154 g 1,8- octanediol and 0.2167 g glycerol were added to a 250 ml three-neck round-bottom flask, fitted with an inlet adapter and an outlet adapter. The mixture was melted within 15 min by stirring at 160-165° C. in silicon oil bath, and then the temperature of the system was lowered to 120° C. The mixture was stirred for another hour at 140° C. to get the pre-polymer. Nitrogen was vented throughout the above procedures. The pre-polymer was post-polymerized at 60° C., 80° C. or 120° C. with and without vacuum for predetermined time from one day to 3 weeks depending on the temperature to achieve the Poly(1,8-octanediol-co-citric acid-co-1% glycerol). Nitrogen was introduced into the reaction system before the polymer was taken out from reaction system.

EXAMPLE 8

Synthesis of Poly(1,8-octanediol-citric acid-co-polyethylene oxide)

In a typical experiment, 38.424 g citric acid, 14.623 g 1,8-octanediol and 40 g polyethylene oxide with molecular weight 400 (PEO400)(100 g PEO1000 and 200 g PEO2000 respectively) (molar ratio: citric acid/1,8-octanediol/PEO400=1/0.5/0.5) were added to a 250 ml or 500 ml three-neck round-bottom flask, fitted with an inlet adapter and an outlet adapter. The mixture was melted within 15 min by stirring at 160-165° C. in silicon oil bath, and then the temperature of the system was lowered to 135° C. The mixture was stirred for 2 hours at 135° C. to get the pre-polymer. Nitrogen was vented throughout the above procedures. The pre-polymer was post-polymerized at 120° C. under vacuum for predetermined time from one day to 3 days to achieve the Poly(1,8-octanediol-citric acid-co-polyethylene oxide). Nitrogen was introduced into the reaction system before the polymer was taken out from reaction system. The molar ratios can be altered to achieve a series of polymers with different properties.

EXAMPLE 9

Synthesis of Poly(1,12-dodecanediol-citric acid-co-polyethylene oxide)

In a typical experiment, 38.424 g citric acid, 20.234 g 1,12-dodecanediol and 40 g polyethylene oxide with molecular weight 400 (PE0400) (100 g PE01000 and 200 g PE02000 respectively) (molar ratio: citric acid/1,8-octanediol/PEO400=1/0.5/0.5) were added to a 250 ml or 500 ml three-neck round-bottom flask, fitted with an inlet adapter and an outlet adapter. The mixture was melted within 15 min by stirring at 160-165° C. in silicon oil bath, and then the temperature of the system was lowered to 120° C. The mixture was stirred for half an hour at 120° C. to get the pre-polymer. Nitrogen was vented throughout the above procedures. The pre-polymer was post-polymerized at 120° C. under vacuum for predetermined time from one day to 3 days to achieve the Poly(1,12-dodecanediol-citric acid-co-polyethylene oxide). Nitrogen was introduced into the reaction system before the polymer was taken out from reaction system. The molar ratios can be altered to achieve a series of polymers with different properties.

EXAMPLE 10

Synthesis of Poly(1,8-octanediol-citric acid-co-N-methyldiethanoamine) POCM

In a typical experiment, 38.424 g citric acid, 26.321 g 1,8-octanediol and 2.3832 g N-methyldiethanoamine (MDEA) (molar ratio: citric acid/1,8-octanediol/MDEA=1/0.90/0.10) were added to a 250 ml or 500 ml three-neck round-bottom flask, fitted with an inlet adapter and an outlet adapter. The mixture was melted within 15 min by stirring at 160-165° C. in silicon oil bath, and then the temperature of the system was lowered to 13520° C. The mixture was stirred for half an hour at 120° C. to get the pre-polymer. Nitrogen was vented throughout the above procedures. The pre-polymer was post-polymerized at 80° C. for 6 hours, 120° C. for 4 hours without vacuum and then 120° C. for 14 hours under vacuum to achieve the Poly(1,8-octanediol-citric acid-co-N-methyldiethanoamine). Nitrogen was introduced into the reaction system before the polymer was taken out from reaction system. The molar ratios can be altered to citric acid/1,8-octanediol/MDEA=1/0.95/0.05.

EXAMPLE 11

Synthesis of Poly(1,12-dodecanediol-citric acid-co-N-methyldiethanoamine) PDDCM

In a typical experiment, 38.424 g citric acid, 36.421 g 1,12-dodecanediol and 2.3832 g N-methyldiethanoamine (MDEA) (molar ratio: citric acid/1,8-octanediol/MDEA=1/0.90/0.10) were added to a 250 ml or 500 ml three-neck round-bottom flask, fitted with an inlet adapter and an outlet adapter. The mixture was melted within 15 min by stirring at 160-165° C. in a silicon oil bath, and then the temperature of the system was lowered to 120° C. The mixture was stirred for half an hour at 120° C. to get the pre-polymer. Nitrogen was vented throughout the above procedures. The pre-polymer was post-polymerized at 80° C. for 6 hours, 120° C. for 4 hours without vacuum and then 120° C. for 14 hours under vacuum to achieve the Poly(1,12-dodecanediol-citric acid-co-N-methyldiethanoamine). Nitrogen was introduced into the reaction system before the polymer was taken out from reaction system. The molar ratios can be altered to citric acid/1,12-dodecanediol/MDEA=1/0.95/0.05.

EXAMPLE 12

Calcium Modification of Different Polymers

In a typical experiment, POC and PDDC films or scaffolds were immersed in a 0.1M $CaCl_2$ solution for 1 week, rinsed in mini-Q water and then freeze-dried. The dry samples were stored in a desiccator before use. In order to evaluate calcium modification on mechanical properties of POC and PDDC, POC and PDDC was tested under different treating conditions.

Mechanical test results show that calcium under wet conditions, calcium treatment (1 week) may help to maintain appropriate tensile stress for POC compared to PBS 1 week of treatment with phosphate buffered saline (PBS). Calcium treatment has dramatic effects on elongation for POC. After 1 week of calcium treatment, POC can maintain a similar elongation rate compared to 1 week of PBS (phosphate buffer solution) 1 week treatment. Even after 1 more week of PBS treatment following 1 week of calcium treatment, the height elongation rate of POC can be still maintained. Since PDDC is more hydrophobic than POC, the effects of calcium treatment on tensile stress and elongation of PDDC is less than that on POC. This results show that calcium ions chelated by unreacted carboxyl group of POC and PDDC synthesized under mild condition (80° C. 2 days) act as crosslinkers to help to maintain the elasticity and appropriate strength of polymers (FIG. 14).

EXAMPLE 13

Synthesis of POC-Hydroxyapatite (HA) Composite

In a typical experiment, 19.212 g citric acid and 14.623 g Octanediol (molar ratio 1:1) of Citric Acid and 1,8-octanediol was reacted in a 250 ml three-neck round-bottom flask at 165° C., forming a pre-polymer solution. Specific amount of HA was then added to reaction vessel while stirring with a mechanical stirrer. Acetone was then added until solution liquefied into a slurry state. Solution was then cast into a Teflon mold and set in a vacuum oven at 120° C. for 2-4 hours or until the acetone was purged. Film was then incubated without vacuum at 120° C. overnight allowing the solution to set. Film could then be post polymerized for various durations depending upon the desired properties. Mechanical tests on POC-HA (40 wt %) shows tensile stress is as high as 10.13±0.57 MPa and elongation is 47.78±3.00. Specimen recovery completely after pulling by mechanical tester.

EXAMPLE 14

Comparison of the Properties of Different Polymers

Figure 4:
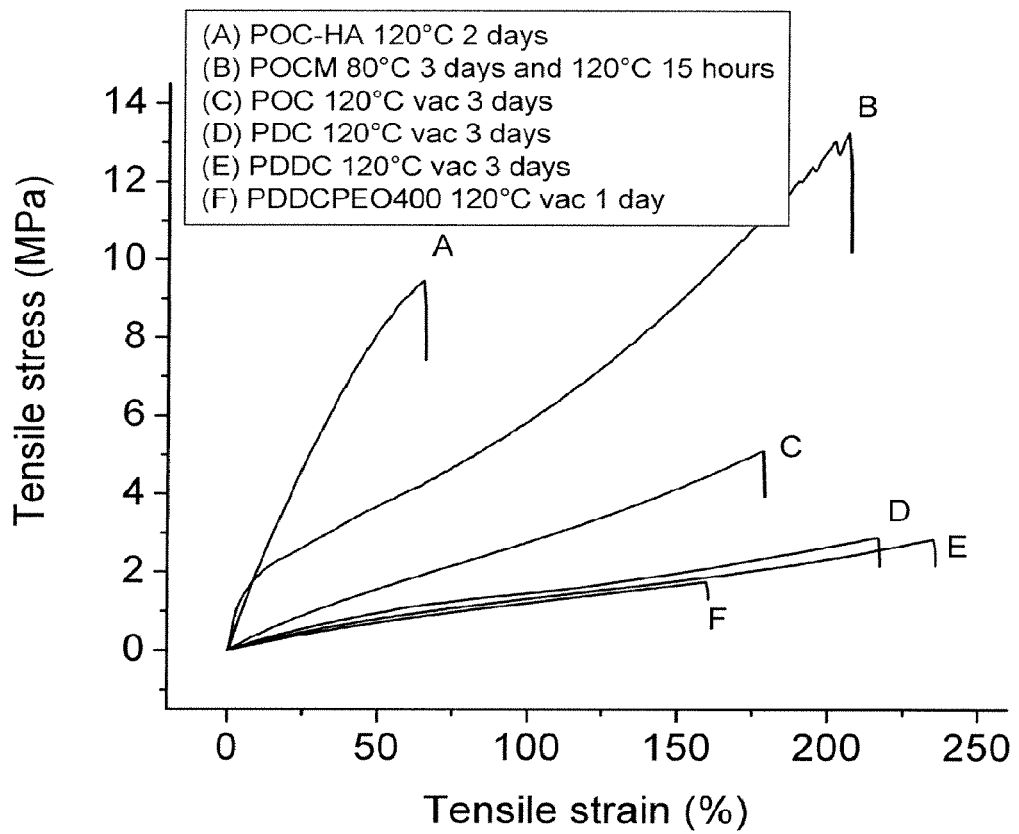
FIG. 4 is a comparison of the stress-strain curves of POC, PDC, PDDC, PDDCPEO400, POCM and POC-HA.

FIG. 4 shows that the mechanical properties of the polymer can be modulated by choosing different diol monomers. The maximum elongation ratio for the polymer at break can reach 265:!:10.5% similar to that of arteries and vein (up to 260%) [10]. The minimum tensile Young's modulus can reach 1.4: !:0.2 MPa. The Young's modulus is between those of ligament (KPa scale) [11] and tendon (GPa scale) [12].

Similar to the vulcanized rubber, POC, PDC, and PDDC are thermoset elastomers. In general, thermoset polymers can not be dissolved in common solvents which adds to the difficulty in making the polymer into a scaffold for tissue engineering applications. The present application describes a method to fabricate porous and non-porous scaffolds which makes it possible to be used in tissue engineering utilizing the solubility of the pre-polymer in some solvent such as dioxane, acetone, 1,3-dioxlane, ethanol, N,N-dimethylformamide. Therefore, this family of polymers is a potential elastomer in tissue engineering especially in soft tissue engineering.

EXAMPLE 15

Further Characterization of Solid Polymeric Materials

This example is directed to the extent of cross-linking of the polymeric materials. Current methods to determine the molecular weight of a polymer include osmotic pressure, light scattering, ultracentrifugation, solution viscosity, and gel permeation chromatography measurements. All of these methods normally require a polymer that can be dissolved in specific solvents.[24] Crosslinked polymers can not be dissolved in a solvent and their molecular weight is considered to be infinite. However, a useful parameter to characterize crosslinked polymers is molecular weight between cross-links (Mc), which can give a measure of the degree of cross-linking and therefore some insight into mechanical properties. According the theory of rubber elasticity, molecular weight between crosslinks can be calculated using Equation (1) under some assumptions:[25]

$$n = \frac{E_0}{3RT} = \frac{\rho}{M_c} \quad (1)$$

where n represents the number of active network chain segments per unit volume; Mc represents the molecular weight between cross-links (mol/m$^3$); $E_0$ represents Young's modulus (Pa); R is the universal gas constant (8.3144 J·mol-1·K-1); T is the absolute temperature (K); $\rho$ is the elastomer density (g/m$^3$) as measured via volume method.[26] From Equation (1), molecular weight between crosslinks can only be obtained after mechanical tests and polymer density measurements. Another method for determining molecular weight between crosslinks for a crosslinked polymer is by swelling the polymer.[27] Using the swelling method, molecular weight between crosslinks can be calculated by Equation (2).

$$\frac{1}{M_c} = \frac{2}{M_n} - \frac{\frac{v}{V_1}[\ln(1 - v_{2,s}) + v_{2,s} + \chi_1 v_{2,s}^2]}{v_{2,s}^{1/3} - \frac{v_{2,s}}{2}} \quad (2)$$

where Mc is the number average molecular weight of the linear polymer chain between cross-links, $\upsilon$ is the specific volume of the polymer, $V_1$ is the molar volume of the swelling agent and $\chi_1$ is the Flory-Huggins polymer-solvent interaction parameter. $\upsilon_{2s}$ is the equilibrium polymer volume fraction which can be calculated from a series of weight measurements.

EXAMPLE 16

Novel Biphasic Scaffold Design for Blood Vessel Tissue Engineering

Figure 15:
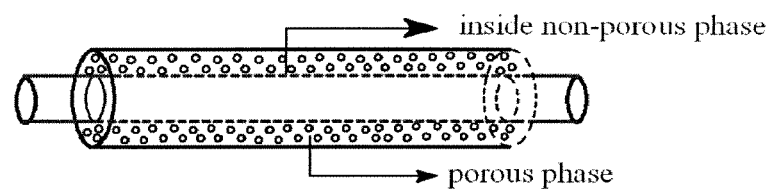
FIG. 15 is a schematic drawing depicting a biphasic scaffold.
Figure 16A:
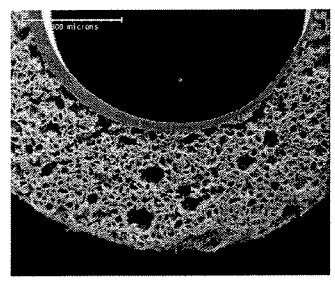
FIG. 16 shows SEM pictures of A) a cross section of a POC biphasic scaffold; B) the pore structure of the porous phase; C) human aortic smooth muscles cells on the porous phase of co-cultured biphasic scaffold; D) human aortic endothelial cells on the lumen of co-cultured biphasic scaffold.
Figure 16B:
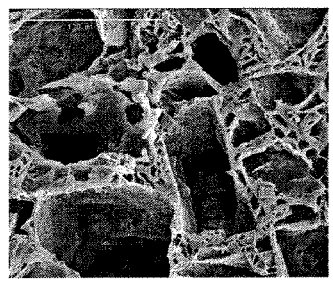
Figure 16C:
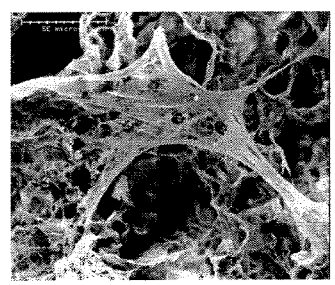
Figure 16D:
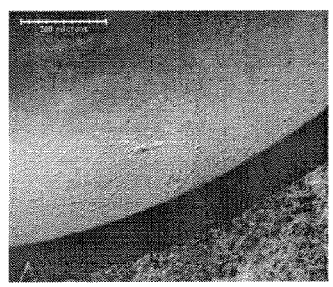

Biphasic scaffolds consist of outside porous phase and inside non-porous phase as depicted in the schematic drawing shown in FIG. 15. The non-porous phase is expected to provide a continuous surface for EC adhesion and spreading, mechanical strength, and elasticity to the scaffold. The porous phase will facilitate the 3-D growth of smooth muscle cells. Biphasic scaffolds were fabricated via following procedures. Briefly, glass rods (~3 mm diameter) were coated with the pre-polymer solution and air dried to allow for solvent evaporation. Wall thickness of the tubes can be controlled by the number of coatings and the percent pre-polymer in the solution. The pre-coated pre-polymer was partially post-polymerized under 60° C. for 24 hr; the pre-polymer-coated glass rod is then inserted concentrically in a tubular mold that contains a salt/pre-polymer slurry. The pre-polymer/outer-mold/glass rod system is then placed in an oven for further post-polymerization. After salt-leaching [4], the biphasic scaffold was then de-molded from the glass rod and freeze dried. The resulting biphasic scaffold was stored in a desiccator before use. The same materials or different materials from the above family of elastomers can be utilized for both phases of the scaffold. Other biomedical materials widely used in current research and clinical application such as polylactide (PLA), polycaprolactone (PCL), poly(lactide-co-glycolide) (PLGA) may also be utilized for this novel scaffold design.

The thickness, degradation, and mechanical properties of inside non-porous phase can be well controlled by choosing various pre-polymers of this family of elastomers, pre-polymer concentration, coating times and post-polymerization conditions (burst pressure can be as high as 2800 mmHg). The degradable porous phase and non-porous phases are integrated since they are formed in-situ via post-polymerization. The cell culture experiments shown in FIG. 16 confirm that both HAEC and HASMC can attach and grow well in biphasic scaffolds. The results suggest that a biphasic scaffold design based on poly(diol-co-citrate) is a viable strategy towards the engineering of small diameter blood vessels.

EXAMPLE 17

Materials and Methods Employed for Polymer Characterization

In addition to the materials and methods described above, the following materials and methods also are exemplary of the studies performed herein.

Polymer Synthesis

Preparation of poly(1,8-Octanediol-co-citric acid) (POC) films: [23] All chemicals were purchased from Sigma-Aldrich (Milwaukee, Wis.). Equimolar amounts of citric acid and 1,8-octanediol were added to a 250 ml three-neck round-bottom flask, fitted with an inlet and outlet adapter. The mixture was melted under a flow of nitrogen gas by stirring at 160° C.-165° C. in a silicon oil bath, and then the temperature of the system was lowered to 140° C. The mixture was stirred for another hour at 140° C. to create the pre-polymer solution. The pre-polymer was cast in glass dishes and post-polymerized at 80° C., 120° C. or 140° C. under vacuum (2 Pa) or no vacuum for times ranging from 1 day to 2 weeks to create POC films with various degrees of cross-linking.

Mechanical Tests

Tensile tests were conducted according to ASTM D412a on an Instron 5544 mechanical tester equipped with 500 N load cell (Instron Canton, Mass.). Briefly, a dog-bone-shaped sample (26×4×1.5 mm, Length×Width×Thickness) was pulled at a rate of 500 mm/min. Values were converted to stress-strain and a Young's modulus was calculated. 4-6 samples were measured and averaged.

Molecular Weight Between Crosslinks Measurements

The molecular weight between crosslinks of POC was calculated using Equation (1).

Swelling Studies

Polymers were cut into rectangular strip and the initial length, width and thickness measured with calipers. The polymers were then swollen in DMSO at 37° C. overnight to achieve equilibrium swelling. The equilibrium length, width, and thickness were measured to determine the change in volume upon swelling.

Results and Discussion

Mechanical Tests and Molecular Weight Measurements of POC

POC samples of various degrees of cross-linking were synthesized by reacting the polyfunctional monomer citric acid with the difunctional monomer 1,8-octanediol under different post-polymerization conditions and the resulting polymer films were subjected to mechanical tensile tests and molecular weight between crosslinks measurements.[25] The results in Table 1 indicate that increased crosslinking temperatures and time increase the tensile stress, Young's modulus and the number of active network chain segment per unit volume (crosslinking density) while decreasing the molecular weight between crosslinks. Therefore, the mechanical properties of POC can be well controlled by controlling polymer network structures via post-polymerization under different conditions.

TABLE 1

Mechanical properties, the number of active network chain segment per unit volume (Crosslinking density): n) and molecular weight between crosslinks (Mc) of POC synthesized under different conditions

| POC | Polymerization condition | Young's Modulus (MPa) | Tensile Stress (MPa) | n (mol/m$^3$) | Mc (g/mol) |
|---|---|---|---|---|---|
| LS1 | 80° C., no vacuum, 2 days | 1.38 ± 0.21 | 1.64 ± 0.05 | 182.59 ± 27.78 | 6874 ± 148 |
| LS2 | 80° C., high vacuum, 2 days | 1.72 ± 0.45 | 1.90 ± 0.22 | 227.58 ± 59.54 | 5445 ± 116 |
| LS3 | 120° C., high vacuum, 1 day | 2.84 ± 0.12 | 3.62 ± 0.32 | 375.77 ± 15.88 | 3301 ± 218 |
| LS4 | 120° C., high vacuum, 2 days | 3.13 ± 0.27 | 3.66 ± 0.61 | 414.14 ± 35.72 | 2971 ± 76 |
| LS5 | 120° C., high vacuum, 3 days | 4.69 ± 0.48 | 5.34 ± 0.66 | 620.68 ± 63.51 | 1857 ± 81 |
| LS6 | 140° C., high vacuum, 2 days | 6.07 ± 0.52 | 5.73 ± 1.39 | 803.14 ± 68.80 | 1516 ± 269 |
| LS7 | 80° C., no vacuum, 5 days | 2.21 ± 0.17 | 3.90 ± 0.60 | 292.41 ± 22.49 | 4326 ± 68 |
| LS8 | 80° C., no vacuum, 14 days | 2.24 ± 0.09 | 2.55 ± 0.21 | 296.38 ± 11.91 | 4265 ± 33 |

REFERENCES

[1] Langer R, Vacanti I P. Tissue engineering. Science 1993, 260:920
[2] Griffith L G. Polymeric biomaterials. Acta Mater. 2000, 48:263-277
[3] Guldberg R E. Consideration of mechanical factors. Ann. N.Y. Acad. Sci. 2002; 961:312-314.
[4] Wang Y D, Ameer G A, Sheppard B I, Langer R. Nature Biotechnology, 2002; 20:602-606.
[5] Greenwald S E, Berry C L. I. Pathol. 2000; 190:292-299.
[6] Xue L, Greisler H P I. Vas. Surg. 2003; 37:472-480.
[7] Kim B S, Putnam A J, Kulik T I, Mooney D I. Biotechnol. Bioeng. 1998; 57:46-54.
[8] Ziegler T, Nerem R M. I. Cell. Biochem. 1994; 56:204-209.
[9] K weon H Y, Yoo M K, Park I X, Kim T H, Lee H C, Lee H S, Oh I S, Akaike T, Cho C S. Biomaterials 2003; 24:801-808.
[10] Lee M C, Haut R C. I Biomech. 1992; 25:925-927.
[11] Chiba M, Komatsu K. I. Biomech. 1993; 26:561-570.
[12] Misof K, Rapp G, Fmtzi P A. Biophys. I. 1997; 72:1376-1381.
[13] Carnagey I, Hem-Anderson D, Ranieri I, Schmidt C E. I. Biomed. Mater. Res. Part B: Appl Biomater 2003; 65B: 171-179.
[14] Consigny P M. Long Term Eff Med Implants 2000; 10:79-95.
[15] Bordenave L, Remy-Zolghadri M, Fernandez P, Bareille R, Midy D. Endothelium 1999; 6:267-275.
[16] Hubbell I A, Massia S P, Desai N P, Drumheller P D. Biotechnology 1991; 9:568-572.

[17] Greisler H P, Chatelier R C, Gengenhach T R, Johnson G, Steele I G. Biomater Sci Polymer Ed. 1994; 5 :531-554.
[18] Bos G W, Poot A A, Beugeling T, van Aken W G, Feijen I. Archieve of Physiology and Biochemistry 1998; 106: 100-115.
[19] Dekker A, Reitsma K. Beugeling T, Feijen I, van Aken W G. Biomaterials 1991; 12:130-138.
[20] van Wachem P B, Beugeling T, Feijen I, Biomaterials 1985; 6:403-408.
[21] Yang J, Bei J Z, Wang S G. Biomaterials, 2002; 23:2607-2614.
[22] Yang J, Shi G X, Bei J Z, Wang S G, Cao Y L, Shang Q X, Yang G H, Wang W J. J. Biomed. Mater. Res. 2002, 62(3):438.446.
[23] J. Yang, A. R. Webb, G. A. Ameer. Advanced Materials 2004; in press:
[24] F. W. L. Harry R. Allcock, e. New Jersey: Prentice-Hall, Inc. 1990.
[25] L. H. Sperling, e. New York: John Wiley & Sons. 1992.
[26] J. Yang, G. X. Shi, J. Z. Bei, S. G. Wang, Y. L. Cao, Q. X. Shang, G. H. Yang, W. J. Wang. J. Biomed. Mater. Res. 2002; 62: 438.
[27] L. J. Suggs, E. Y. Kao, L. L. Palombo, R. S. Krishnan, M. S. Widmer, A. G. Mikos, in Polymers for Tissue Engineering, (Eds: H. A. H. M. S. Shoichet). Utrecht: VSP. 1998 p. 99.
[28] H. G. Barth, e. New York: Wiley Interscience. 1984.
[29] G. Gouesbet, G. Grehan, e. New York: Plenum Press. 1988.
[30] B. Chu, e. 2nd ed. New York: Academic Press. 1991.
[31] Y. A. Akpalu, Y. Lin. Journal of Polymer Science: Part B: Polymer Physics 2002; 40: 2714.
[32] M. S. Lisowski, Q. Liu, J. Cho, J. Runt, F. Yeh, B. S. Hsiao. Macromolecules 2000; 33: 4842.
[33] J. H. v. Zanten, H. G. Monbouquette. Journal of Colloid and Interface Science 1994; 165:
[34] M. Siddiq, C. Wu, B. Li. Journal of Applied Polymer Science 1996; 60: 1995.
[35] Y. L. Kim, Y. Liu, R. K. Wali, H. K. Roy, M. J. Goldberg, A. K. Kromine, K. Chen, V. Backman. IEEE J. Sel. Top. Quant. Elect. 2003; 9: 243.
[36] Y. D. Wang, G. A. Ameer, B. J. Sheppard, R. Langer. Nature Biotechnology 2002; 20: 602.
[37] U. W. Gedde, e. 1st ed. New York: Chapman & Hall. 1995.
[38] N. A. Peppas, B. D. Barr, in Hydrogels in Medicine and Pharmacy, (Eds: N. A. Peppas). CRC Press: Boca Raton, Fla. 1988 p. 27.
[39] J. R. Vega, L. M. Gugliotta, V. D. G. Gonzalez, G. R. Meira. Journal of Colloid and Interface Science 2003; 261: 74.
[40] M. Barlett, H. Jiang. Physical Review E. Statistical Physics, Plasmas, Fluids, and Related Interdisciplinary Topics 2002; 65: 031906/1.
[41] E. Szuromi, M. Berka, J. Borbály. Macromolecules 2000; 33: 3993.

What is claimed is:

1. A thermoset elastomer comprising crosslinked polyesters having the formula:

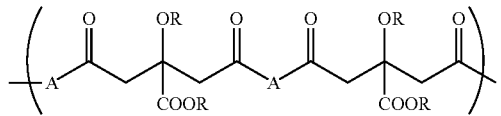

wherein R is selected from a hydrogen or a poly(diol citrate); and wherein each A is $O(CH_2)_xO$, wherein x is 7-14.

2. The thermoset elastomer of claim 1, wherein each A is $O(CH_2)_8O$, $O(CH_2)_{10}O$, or $O(CH_2)_{12}O$.

3. The thermoset elastomer of claim 1, produced by the polycondensation of citric acid with a linear alkane diol having the formula $HO(CH_2)_xOH$, wherein x is 7-14.

4. The thermoset elastomer of claim 2, produced by the polycondensation of citric acid with one or more of 1,8-ocantediol, 1,10-decanediol, and 1,12-dodecanediol.

5. The thermoset elastomer of claim 1, wherein each A is the same.

6. The thermoset elastomer of claim 1, wherein the polyester network is biodegradeable.

7. The thermoset elastomer of claim 1, wherein the polyester network is biocompatable.

8. The thermoset elastomer of claim 1, wherein said insoluble polyester network is porous.

9. The thermoset elastomer of claim 1, wherein said insoluble polyester network is non-porous.

* * * * *

UNITED STATES PATENT AND TRADEMARK OFFICE
CERTIFICATE OF CORRECTION

PATENT NO.        : 8,911,720 B2                                Page 1 of 1
APPLICATION NO.   : 13/596529
DATED             : December 16, 2014
INVENTOR(S)       : Guillermo Ameer et al.

It is certified that error appears in the above-identified patent and that said Letters Patent is hereby corrected as shown below:

In the Specification

In Column 1, lines 9-12, the federal funding statement should read as follows:

--STATEMENT REGARDING FEDERALLY SPONSORED RESEARCH OR DEVELOPMENT

This invention was made with government support under grant number HL071921 awarded by the National Institutes of Health. The government has certain rights in the invention.--

Signed and Sealed this
Thirty-first Day of March, 2015

Michelle K. Lee
*Director of the United States Patent and Trademark Office*